United States Patent
Fox et al.

(10) Patent No.: US 12,469,063 B2
(45) Date of Patent: Nov. 11, 2025

(54) GENERATION OF PRODUCT VIDEOS USING MACHINE LEARNING

(71) Applicant: INTERNATIONAL BUSINESS MACHINES CORPORATION, Armonk, NY (US)

(72) Inventors: Jeremy R. Fox, Georgetown, TX (US); Martin G. Keen, Cary, NC (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 18/050,103

(22) Filed: Oct. 27, 2022

(65) Prior Publication Data

US 2024/0144337 A1     May 2, 2024

(51) Int. Cl.
| | |
|---|---|
| *G06Q 30/0601* | (2023.01) |
| *G06N 3/045* | (2023.01) |
| *G06N 3/047* | (2023.01) |
| *G06N 3/08* | (2023.01) |
| *G06N 20/00* | (2019.01) |
| *G06Q 30/0241* | (2023.01) |
| *G06T 11/60* | (2006.01) |

(52) U.S. Cl.
CPC ......... *G06Q 30/0623* (2013.01); *G06N 20/00* (2019.01); *G06Q 30/0276* (2013.01); *G06Q 30/0643* (2013.01); *G06T 11/60* (2013.01)

(58) Field of Classification Search
None
See application file for complete search history.

(56) References Cited

U.S. PATENT DOCUMENTS

| | | |
|---|---|---|
| 9,571,827 B2 | 2/2017 | Su |
| 10,540,578 B2 | 1/2020 | Madani |
| (Continued) | | |

FOREIGN PATENT DOCUMENTS

| | | |
|---|---|---|
| CN | 111091151 A | 5/2020 |

OTHER PUBLICATIONS

Guo et al., "Auto-Embedding Generative Adversarial Networks For High Resolution Image Synthesis", https://arxiv.org/pdf/1903.11250, Mar. 29, 2019, pp. 1-12.

(Continued)

*Primary Examiner* — Hung Q Dang
(74) *Attorney, Agent, or Firm* — Anthony Curro (57) ABSTRACT

A computer-implemented method, a computer system and a computer program product automatically generate product videos based on requested feature sets in stored data. the method includes acquiring a plurality of product features from a server, where each product feature in the plurality of product features is associated with data selected from a group consisting of: text data, audio data, and image data. The method also includes receiving a request for a product video, where a product in the product video comprises a set of product features in the plurality of product features. The method further includes identifying the data associated with each product feature in the set of product features for the request. Lastly, the method includes generating the product video based on identified data for the product.

17 Claims, 2 Drawing Sheets

(56) References Cited

U.S. PATENT DOCUMENTS

| | | | |
|---|---|---|---|
| 10,839,269 | B1 | 11/2020 | Al-Turki |
| 10,997,464 | B2 | 5/2021 | Yang |
| 11,037,222 | B1* | 6/2021 | Natesh ............... G06Q 30/0643 |
| 11,250,329 | B2 | 2/2022 | Karras |
| 2009/0262238 | A1* | 10/2009 | Hope ................... H04N 21/845 |
| | | | 348/E7.003 |
| 2016/0357408 | A1* | 12/2016 | Zavar ................. G06Q 30/0603 |
| 2017/0264934 | A1* | 9/2017 | Guo ................... H04N 21/8547 |
| 2020/0228880 | A1* | 7/2020 | Iyer ...................... H04N 21/251 |
| 2020/0273062 | A1 | 8/2020 | Probell |
| 2020/0280730 | A1 | 9/2020 | Wang |
| 2021/0049468 | A1 | 2/2021 | Karras |
| 2021/0090130 | A1* | 3/2021 | Daly .................. G06Q 30/0242 |
| 2021/0174426 | A1* | 6/2021 | Isaacson .................. G07G 1/14 |
| 2021/0281878 | A1 | 9/2021 | Chan |
| 2021/0390319 | A1 | 12/2021 | Yang |
| 2022/0004809 | A1 | 1/2022 | Iyer |
| 2022/0092420 | A1 | 3/2022 | Lu |
| 2022/0138473 | A1 | 5/2022 | Kwatra |
| 2022/0180190 | A1 | 6/2022 | Verma |
| 2023/0393833 | A1* | 12/2023 | Cain, Jr. ............... H04L 9/3247 |

OTHER PUBLICATIONS

Hoffmann et al., "ProGAN: Toward A Framework For Process Monitoring And Flexibility By Change Via Generative Adversarial Networks", https://link.springer.com/chapter/10.1007/978-3-030-94343-1_4, SpringerLink, Jan. 23, 2022, pp. 1-14.

IBM, "IBM Watson Advertising Accelerator", Dynamic Creative Optimization, https://www.ibm.com/products/watson-advertising accelerator, Accessed Jul. 11, 2022, pp. 1-14.

IBM, "IBM Watson Advertising", AI-Powered Advertising Solutions, https://www.ibm.com/watson-advertising, Accessed Jul. 11, 2022, pp. 1-10.

Liu et al., "GL-GAN: Adaptive Global And Local Bilevel Optimization For Generative Adversarial Network", https://doi.org/10.1016/j.patcog.2021.108375, Elsevier, ScienceDirect, Pattern Recognition, vol. 123, 2022, pp. 1-11.

Qi et al., "STC-GAN : Spatio-Temporally Coupled Generative Adversarial Networks For Predictive Scene Parsing", https://ieeexplore.ieee.org/document/9052709, IEEE Transactions on Image Processing, vol. 29, 2020, pp. 5420-5430.

Zhang et al., "Multi-Modal Generative Adversarial Network For Short Product Title Generation In Mobile E-Commerce", https://doi.org/10.48550/arXiv.1904.01735, Apr. 3, 2019, pp. 1-9.

* cited by examiner

GENERATION OF PRODUCT VIDEOS USING MACHINE LEARNING

BACKGROUND

Embodiments relate generally to creating and modifying images in videos using machine learning and, more specifically, to automated generation of product videos based on requested feature sets using stored data and machine learning.

In the modern technology ecosystem, where many commerce transactions are carried out over the Internet, it may be common for manufacturers to launch and market products using video advertisements of such products. These videos may demonstrate the use of the products to highlight features or may be instructional videos that explain how the product is used, e.g., the features and functionality of the product. Video advertisements may be published in the public domain, e.g., posted on the Internet or sent as an email to a distribution list, or may be broadcasted on television as an advertisement that may be seen by viewers of certain programs. As product features change through releases of new products or new versions, video advertisements of products may be changed to keep the available information up to date.

SUMMARY

An embodiment is directed to a computer-implemented method for automated generation of product videos based on requested feature sets using stored data. The method may include acquiring a plurality of product features from a server, wherein each product feature in the plurality of product features is associated with data selected from a group consisting of: text data, audio data, and image data. The method may also include receiving a request for a product video, wherein a product in the product video comprises a set of product features in the plurality of product features. The method may further include identifying the data associated with each product feature in the set of product features for the request. Lastly, the method may include generating the product video based on identified data for the product.

In another embodiment, the method may include identifying a product version for each product feature in the plurality of product features and generating a template video for the product version from the data associated with each product feature having the identified product version.

In a further embodiment, the method may include determining that a product feature in the set of product features for the request does not include the product version for the template video. In this embodiment, the method may also include identifying a change to the template video based on the product feature and modifying the template video based on an identified change to the template video.

In yet another embodiment, the modifying the template video may include removing a video frame associated with the product feature from the template video, wherein the product feature is determined to be an obsolete product feature.

In another embodiment, the method may include storing the plurality of product features in a product feature database, wherein the product feature database associates each product feature in the plurality of product features with the data of a respective product feature and the product version for the respective product feature.

In a further embodiment, a machine learning model that predicts video context based on content in a video may be used to identify the change to the template video.

In yet another embodiment, generating the product video may use a generative adversarial network (GAN).

In addition to a computer-implemented method, additional embodiments are directed to a computer system and a computer program product for automated generation of product videos based on requested feature sets using stored data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In the modern technological environment, where commercial marketing and sales transactions are both instant and ubiquitous, manufacturers may create video advertisements of products as they are launched to the public. Such video advertisements may demonstrate the use of a showcased product and the manufacturer may also create instructional videos to explain how the product's functionality should be used. These videos may be published in the public domain in a digital form, such as a video on a public web site, perhaps featured on the front page of the site to showcase the new product, or alternatively may be broadcasted on television as an advertisement during a popular program to a targeted audience. One difficulty of creating video advertisement is that such videos are usually a snapshot of a product at a particular time, meaning that it may be impossible to capture multiple models, or feature sets, of the product, e.g., the different trims of an automobile model, or changes to the product over a period of time. In the case of multiple versions of a product, new features may be added to the product and old features removed from the product, either because of hardware changes or, more commonly, with software updates that change the functionality of a product.

Some examples may include changes to product appearance, such as where a product manufacturer may want to create a promotional video showcasing a digital camera. An existing video may show the camera being used in the field by a photographer but then a newer model of the camera body may be released that may move the camera shutter button further forward and add new buttons for ISO and white balance. The video frames where the photographer is pressing the shutter button may be isolated, such that the identified video frames may be modified to show the new placement of the shutter button and augment the ISO and white balance buttons.

Another example may be revisions to product features, such as another digital camera that may now include an ability to record full HD videos instead of only recording standard definition videos. In this case, an entirely new video may be created that exclusively showcases the change to recording ability and removes the references to features that are now obsolete. One such revision may be that an accessory has been discontinued for a product. If a video exists that shows the use of an accessory that has been discontinued by the manufacturer and can no longer be purchased, the obsolete accessory may be identified in a video and the related video footage may be automatically removed while leaving all other product features in the video unchanged.

It should be noted that revisions to product features are not required to be based on an explicit request from a user but may include a contextual analysis of a request. For example, a user may be watching a video showing the features of a 2022 model automobile and the user may own the 2020 model of the same automobile, which may contain some cosmetic differences. It may be determined that the user owns the prior model of the automobile, and the video may be changed, or a new video generated, to show the 2020 model, as opposed to the 2022 model year automobile.

As a result of the existence of a multitude of products and versions or models of the products, a manufacturer may be required to create multiple videos for release in the public domain, thereby incurring additional cost in creating video advertisements. At the same time, a consumer may have difficulty finding information published by the manufacturer related to a specific model, or feature set, of a product in the public domain, since published product videos may include obsolete features that must be removed, and information about new features may need to be added to a manufacturer's product video, adding to marketing costs of the manufacturer.

It may therefore be useful to provide a method or system that could use machine learning to generate product videos on demand based on requested feature sets using stored data. Such a method may leverage information that may be known to the manufacturer about specific versions or models, including collecting a set of features and associating the feature set with a version or model. In addition, a Generative Adversarial Network (GAN) may be used to automatically align with current or modified product features, where the features may be stored in a database that includes spoken content, such as narration in a related product video, or an interaction pattern with different elements of a product video may be learned such that the manufacturer would not be required to generate multiple product videos for every model and year of production for each iteration. Storing the information about product features may also allow the selection of product videos such that a user may be presented with the choice of allowing access to the current version and model of the product, which may identify product specifications and allow adaptive instructional videos to change dynamically based on what is selected. In addition, textual information about the product may be accessed from the database or other storage such that appropriate video frames may be updated by the method or system to create updated product videos with new features. In addition, obsolete features that may have been removed from a new version of the product may be identified, which may cause the method or system to remove video frames such that the product video would be aligned with the current model or version, as described by a current feature set. In addition to information about features and corresponding product videos, a contextual analysis module may be utilized by the method or system that may analyze the textual description of the product feature or images of the functionalities, which may assist the method or system to auto-adapt the product video and align with currently available product feature sets. A request for a product video may also include a specific version or model, which the method or system may use to create a specific product video for the requested version or model.

Figure 1:
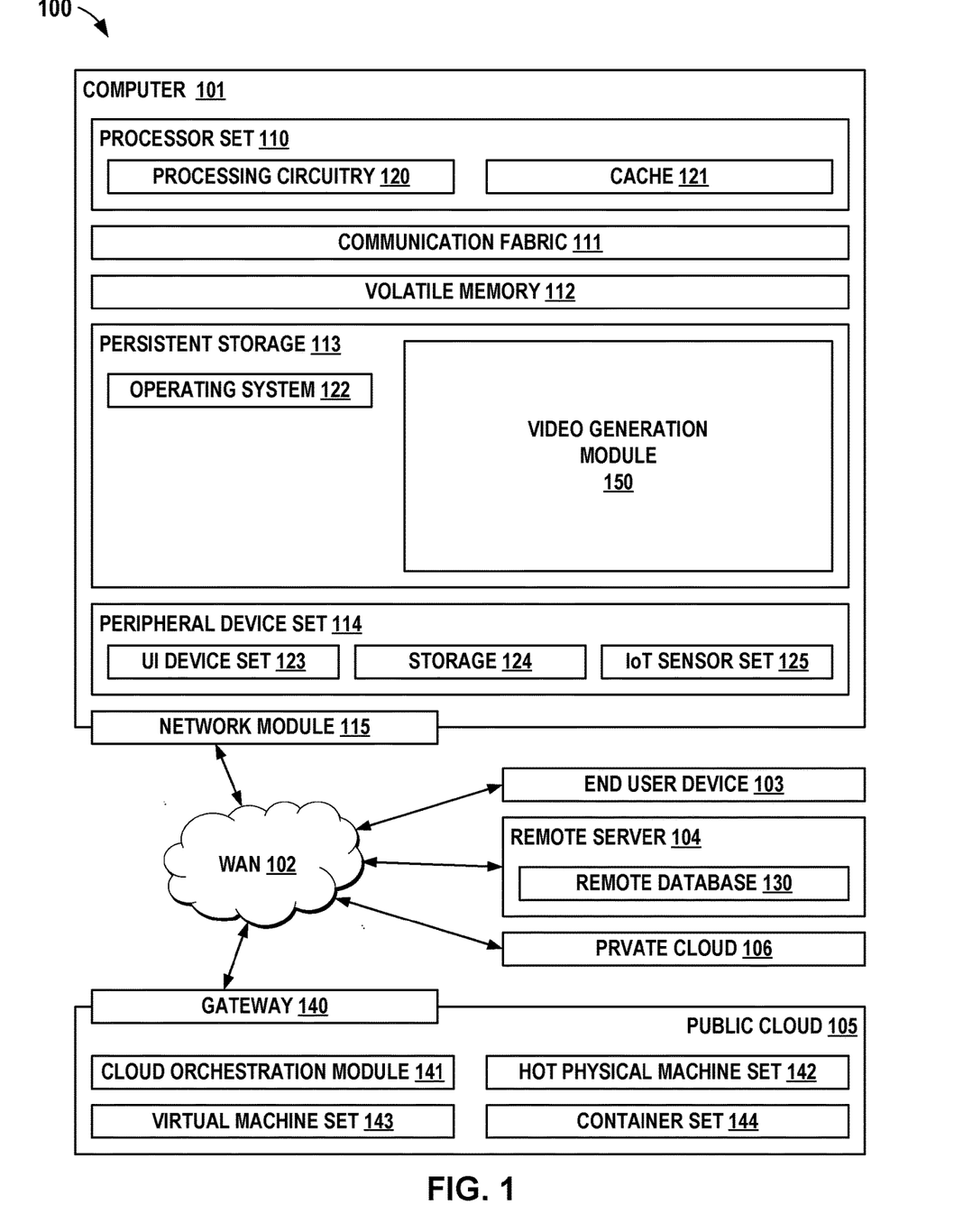
FIG. 1 depicts a block diagram of an example computer system in which various embodiments may be implemented.

Referring to FIG. 1, computing environment 100 contains an example of an environment for the execution of at least some of the computer code involved in performing the inventive methods, such as video generation module 150. In addition to video generation module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and video generation module 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in video generation module 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in video generation module 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Computer environment 100 may be used to generate product videos based on requested feature sets using stored data. In particular, video generation module 150 may acquire a plurality of features for products of a manufacturer and compile the information into a database or other type of indexed storage. Such information about individual features may include video showing the feature in use or audio describing a product feature, such as narration of a product video or other spoken description of the feature, or a text description of the feature, e.g., graphics on a product video or other written description of the feature. Individual video clips or other multimedia materials may be stored in the database as metadata associated with the simple title of the feature, e.g., "improved camera body" or "ability to record high-definition video" in the case of a digital camera, and these materials may be used later to generate a product video that describes a particular product and feature set.

In addition to compiling the available features of a manufacturer's products, the video generation module 150 may also associate the features that are acquired to specific versions or models of a product. As an example, if a new automobile has a new body shape, then an external view of the new body shape may be stored as described above with an additional association to the specific automobile model. As a result, sets of features that correspond to specific products may be identified in the database and, in an optional step, template videos, or "product feature models", may also be created to illustrate the specific feature set. The template videos may be published to the public domain in the event of a specific request for the specific version or model and the template video may be used as a basis for creating a new product video by making changes to the template video, thereby saving effort in creating a video from scratch.

A request may be received to view a specific version or model of a manufacturer's product or to view a specific product feature, in which case the video generation module 150 may have to determine which version or model of a product contains a specific feature. It should be noted that an explicit request need not be made as it is possible that an update has a high priority, or the feature updates are so extensive, and a new product video may be created immediately without further input. Regardless of the exact input, the video generation module may determine from the feature sets that are stored, and any template videos that may have been created, both the feature set that is required for a new product video and also any changes that need to be made to available template videos to generate the product video. Once the video generation module 150 understand the requirements, the module 150 may generate the product video that shows the required feature set. Such video generation may be accomplished using a generative adversarial network (GAN) process.

Figure 2:
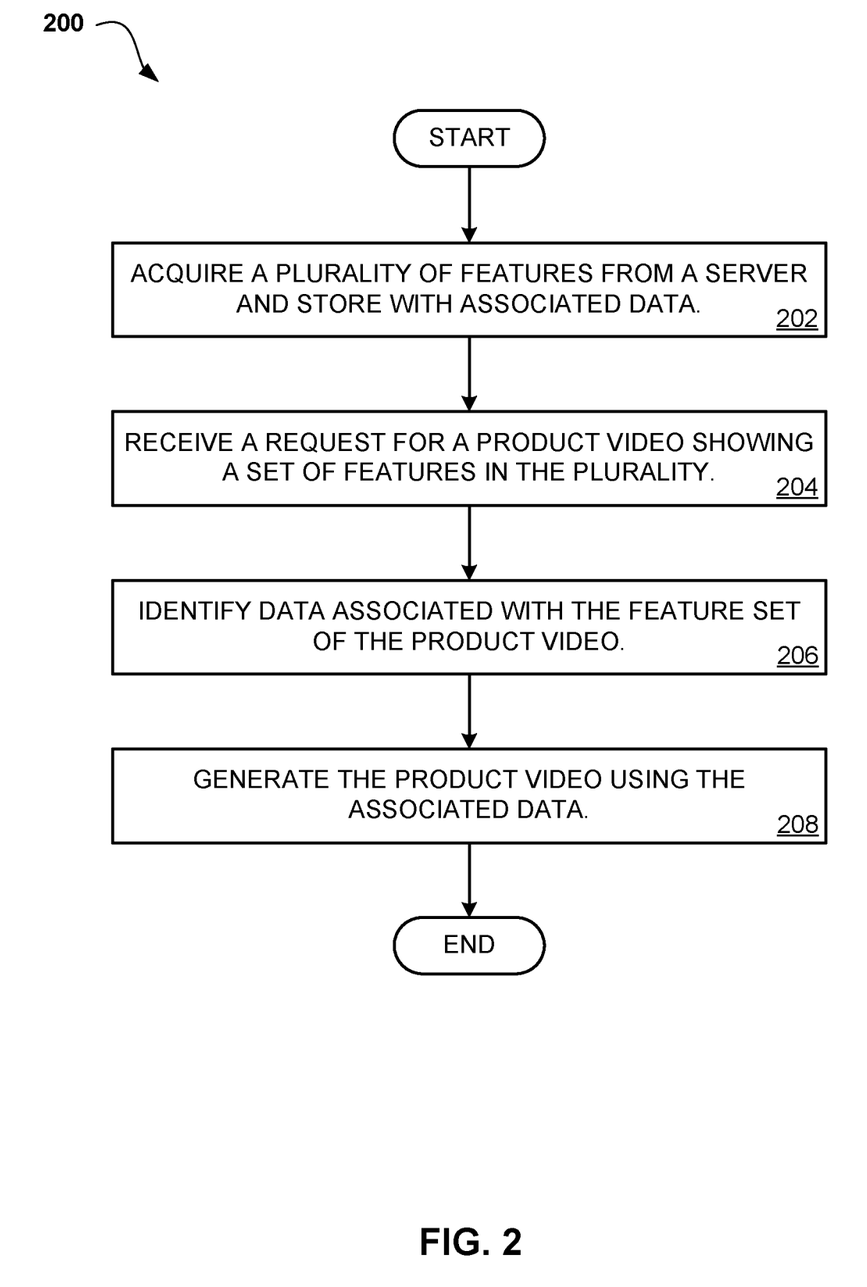
FIG. 2 depicts a flow chart diagram for a process that generates product videos on demand based on requested feature sets using stored data and machine learning according to an embodiment.

Referring to FIG. 2, an operational flowchart illustrating a process 200 that generates product videos on demand based on requested feature sets using stored data and machine learning is depicted according to at least one embodiment. At 202, a plurality of features may be acquired from a server or other source and may be compiled into a database or other indexed storage that includes a short title or description that identifies the feature, including links or attachments that may be written text that further outlines a feature, e.g., a description of the appearance of the feature or a list of steps that may be required to use the feature, such as a manual or other document that may be dedicated to the feature. Also included in the indexed storage may be video that shows the feature or explains the use of the feature and also audio clips, such as the narration of the video or simple audio of a speaker describing the feature or the use of the feature. The database that may be constructed at this step may also associate features with specific models or versions to allow differences between models to be shown and also may be constructed in order of a release time such that iterations over time may be tracked.

The video generation module 150 may use many techniques to acquire and learn about available product features for use in the database or indexed storage, some of which may include a Convolutional Neural Network (CNN), which may include object identification from images of a product such as photographs and videos, e.g., the presence of a button on a camera or the shape of a fender on a car, or Natural language processing (NLP) of a textual description of a product, e.g., "the car has a four-cylinder engine". The textual description may first be generated by a speech-to-text algorithm, where spoken words in an audio or video clip may be converted into text before NLP begins.

Many aspects of product features may be learned at this step and examples of metadata that may be learned and stored may include the name of the manufacturer, a title for the product, which may be a name of the product or a version number, depending on how a manufacturer labels or names models or versions, and a description, as described above, that may describe a product feature and possibly lend context to any linked images, videos or audio about the product feature, including some details about the specific feature, e.g., "the lens is 18-55 mm", or possibly a description of how a feature is utilized within a product, e.g., "this focuses the camera" or "this version of the camera body is easier to hold". Other possibilities include a product line, which may be an organizational grouping containing one or more products with common features, such as all camera models from a manufacturer. It should be noted that this list of possible fields in a database or indexed storage is non-exhaustive and shows examples of fields that may be present. Also, the information that may be learned and stored at this step may be constantly updated such that as product features are updated, both additions of new features and deletions of obsolete features, the compiled information about product features and the connections to models or versions of a manufacturer's products would stay up to date.

Optionally at this step, the video generation module 150 may build a "product feature model", or template video, using continuous input from the ingestion and learning process. The template video may contain visual information that describes commonalities between different versions of a product and also may record differences to be used in future updates. The template video may be built through a process of automatic image processing and comparison against all known products in the corporation. The visual information may include specific time stamps or video frames of specific content, such as a product introduction that may contain key features that were new when a product was introduced, which may represent an important position in the video where updates may need to be made in the future as new features become available for the product. In the same way, specific video frames that may contain key feature updates in future versions or models may also be important to note as this may be the content that would be used to replace the original video content. Changes in visual information may be inferred by feature matching, where a visual sample, or image, may be taken to look for a specific feature within the image. and if the feature is found, then the coordinates of the feature within the image would be saved. In the course of a video, this process may be repeated for each video frame. Changes in visual information may also be extracted from a text description of a feature that may be created by manually watching a video and logging information about what might be displayed in specific video frames. This log could be used to generate a description of the feature which can be matched against other descriptions. As with the database or indexed storage, the product feature model, or template video, mat be updated with newly identified features on a regular basis, allowing the video generation module 150 to automatically adapt to changing product functionality. The template video may also be used to predict future product features by comparing newly released features against all known products from the manufacturer.

At 204, a request may be received for a product video that includes a set of features that is in the plurality of features that has been acquired above. The request may be in the form of an explicit request for a specific version or model but may also be a request for a newest model or for a specific feature that the video generation module may use to infer a version or model of a product. In addition, there may or may not be a request from a specific user at this step. For instance, the module 150 may learn of a new product or feature set and automatically infer that a new product video should be created. In addition, the process of identifying features in 202 may also be interpreted as a request at this step. For instance, in constructing a database of product features, the features may be associated with a version or model of a product. If the version or model is unknown, then this may be a prompt to the module 150 to create a new product video. It is also possible at this step that, if a template video was optionally created in 202, the template video may be used as the product video if the feature set that is requested matches the features in the template video.

Also at this step, a context may be predicted by a machine learning model in the event that a user makes an explicit request for a feature set or a specific product. This context may be learned through the acquisition of video, audio or text data of the user and surrounding physical area at the time of a request, then using techniques such as the natural language processing algorithms described above or object recognition to acquire any information that may enhance what is known about the request. Alternatively, the module 150 may determine context from any video, audio or text data that may have been acquired and stored in 202 with respect to the database or indexed storage using the same or similar techniques. In this case, the context may be used to provide more information about associated features that could be important in the process of determining changes that may be needed to update features, as described below. It should be noted that all collection of information from a user or any video, audio or text that may personally identify a human user or is sensitive in any other way requires the informed consent of all people whose information may be collected and analyzed by video generation module 150. Consent may be obtained in real time or through a prior waiver or other process that informs a subject that their information may be captured by a device or other process and that the information may be used to predict a context and, subsequently, information about product features. The information owner is free to decide at any time to revoke consent for use of sensitive information as these settings are permanently retained to keep the video generation module 150 updated with the latest information and also allow the owner of the information complete control over their informed consent to use sensitive information in the process described herein. The consent described here may also refer to allowing some, or any, data relating to the information owner from being sent to a local server, cloud server or any other location. The owner has complete control on the transmission of information that may be sensitive or personally identify the owner of the information. It should also be mentioned that the owner of sensitive information is free to make decisions with respect to the sensitivity of information at any time and change what they choose to be sensitive information as these settings are permanently retained to allow the owner of the information complete control over their informed consent of the presence of sensitive information in enterprise assets that may have been migrated to open cloud storage.

At 206, the images, audio and text that may be associated with product features in a requested feature set of a product may be identified, including any template videos that may have been created. Also at this step, potential changes that may be required for an identified template video in order to create the requested product video may be identified. The module 150 may examine the feature set of a request and look for content in the feature database that may match the individual features or may use the model or version that is associated with the features in the database or indexed storage to begin the analysis.

In analyzing a template video for possible modification, the module 150 may look at an input video sequence and derive both the version or model of a product featured in a template video and also which video frames must be changed to reflect the version or model of the product that has been requested. To establish the version or model of the product featured in a template video, a process of visual matching may be used where the module 150 may automatically match each scene in the template video against all known product videos stored in the feature database or any other data storage for the manufacturer and search for matching product features. Once a match has been found, the product featured in the template video has been established. At this point, to determine which video frames must be changed, in addition to the features in the set of product features of the request and an associated model or version with the product features in the database or indexed storage, a contextual analysis may be performed to identify product features that a requesting user may already have, through user metadata such as a purchase history or a stated intent. Context may also be learned in the case of a consumer by examining the surroundings of a user making a request or knowledge of a location for the user, e.g., an automobile customer in a cold climate may be determined to be looking for tires that handle well in wintry driving conditions. Any features that may be included in the template video but are not in the requested set of product features would remain unchanged and only product videos containing the requested product feature would be changed to reflect changes in product functionality, which would ensure that users receive an appropriate update. Another potential approach would be to provide update capability for all videos, i.e., all video versions in the database or indexed storage.

In an embodiment, a supervised machine learning model may be trained to predict context of a template video based on the images, audio or text of the template video. One or more of the following machine learning algorithms may be used: logistic regression, naive Bayes, support vector machines, deep neural networks, random forest, decision tree, gradient-boosted tree, multilayer perceptron. In an embodiment, an ensemble machine learning technique may be employed that uses multiple machine learning algorithms together to assure better classification when compared with the classification of a single machine learning algorithm. In this embodiment, training data for the model may include any data that may be included in the database or indexed storage that has been created in this process or any data, including videos, audio or text, that may be stored by a manufacturer or any other entity. The training data may be collected from a single piece of content, e.g., a marketing video for a specific product that may showcase specific features, or multiple pieces of content, e.g., several videos that may be linked to a specific product feature or a specific user. The prediction results may be stored in a database, which may or may not be the same as the database or indexed storage described above, so that the data is most current, and the output would always be up to date.

At 208, the requested product video may be generated from the data associated with the feature set of the request, and therefore the underlying product, including making the identified changes to an identified template video. At this step, a generative adversarial network (GAN) may be used to accomplish the generation of a product video. In a GAN architecture, two models may be used: a generator model that may output new plausible synthetic images and a discriminator model that may classify images as real or synthetic. In such an architecture, the two models may be trained simultaneously in an adversarial fashion such that the generator seeks to fool the discriminator with improved synthetic images and the discriminator seeks to improve its detection of synthetic images, and thus improve its classification model. Over time, the architecture may refine its ability to recognize and transform into one that is most efficient for the algorithm. In short, the generator seeks to create as many realistic images as possible and the discriminator seeks to distinguish between images that are real and generated (fake) images.

An input video sequence may be modified at this step according to changes required in previous stages, so as to reflect newly introduced product functionality. This process may be gradual by feeding successive images into the GAN and modifying image pixels to reflect a specific change in product features. The module 150 may render video frames that take into consideration changes in the physical appearance of a product in the input video, e.g., changes to the body of a camera as described above, changes in environment and lighting that may be needed to make the context clearer to a viewer or to simply improve the view of the product or a specific feature, changes in user interaction or utilization of a product, e.g., a button or other control that may be changed to better suit a user, and also the removal of discontinued or obsolete product features.

The module 150 may include a rendering stage that may use the version or model of product features to modify an input video sequence. This rendering may be achieved through a system of conditional probabilities that ensure that the output video changes from one state to another to reflect differing product features. For example, a lighting change may entail a re-rendering of specific product features. This process would be fully automated and usually occur within the bounds of the video sequence itself, with changes to lighting or environment reflected without any noticeable seam, though for some products it may be necessary to re-render an entire scene. Once again, successive images may be generated for the purposes of identification by a discriminator to ensure that the proper end result is achieved by the process for a given product feature in the requested product feature set. Rendering of a product video from the stored data may include a scene rendering component, where the module 150 may analyze each frame of an input video sequence to measure successions of product features across frames. Each succession would consist of a set of consecutive matched pairs, where the first member in each pair represents a product feature in a previously identified version or model of a product, and the second member represents a product feature in the feature set that has been requested. For every succession, the module 150 may estimate a transformation that would take the first product feature to second product feature within one time step. The transformation would be represented as a patch, or set of pixel values, and stored along with input frame metadata such as a timestamp. A second component would be frame rendering where the module 150 may sample a transformation from the corresponding patch in the scene rendering component and the transformation is then applied to an input frame to result in a new frame of video. Lastly, a final rendering component would combine the new frames with old frames to produce a final output video sequence that would represent the product video that was requested earlier in the process.

It should be noted that in both 206 and 208, changes to a video that may be determined to be required or that may be rendered are not limited to visual aspects of the content. Spoken content, e.g., narration of the video, and textual descriptions appearing in the video may also be included in the aspects that may be altered or generated to reflect changes in product features that may be used in a product video. In addition, the process may also be used to generate product videos for products that may not be featured in an input video sequence, such as by importing images of a product being used in a surrounding environment. In such a case, the module 150 may access a set of images representing different versions or models of products or product features, such as data that may be used in the contextual analysis described above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automated generation of adaptive instructional product videos to indicate how a product is used based on requested feature sets in stored data, the method comprising:
   acquiring a plurality of product features from a server, wherein each product feature in the plurality of product features is associated with data selected from a group consisting of: text data, audio data, and image data;
   receiving a request for an instructional product video, wherein a product in the instructional product video comprises a set of current product features in the plurality of product features, the request for the product video including a request to view instructions to utilize a specific version of a manufacturer's product or to view a specific product feature;
   identifying the data associated with each current product feature in the set of product features for the request for the instructional product video;
   generating the instructional product video using a generative adversarial neural network (GAN) based on identified data for the product, the instructional product video including frames showing the requested version of the manufacturer's product or the specific product feature;
   acquiring a plurality of updated or revised product features from the server, the updated or revised product features associated with an update to the specific version of the manufacturer's product or the specific product feature; and
   generating an updated instructional product video, the updated instructional product video including frames showing the updated or revised product feature associated with the update to the specific version of the manufacturer's product or the specific product feature and instructions how to use the updated specific version of the manufacturer's product or the updated specific product feature.

2. The computer-implemented method of claim 1, further comprising:
   identifying a product version for each product feature in the plurality of product features; and
   generating a template video for the product version from the data associated with each product feature having the identified product version.

3. The computer-implemented method of claim 2, further comprising:
   determining that a product feature in the set of product features for the request does not include the product version for the template video;

identifying a change to the template video based on the product feature; and
modifying the template video based on an identified change to the template video.

4. The computer-implemented method of claim 3, wherein the modifying the template video includes removing a video frame associated with the product feature from the template video, wherein the product feature is determined to be an obsolete product feature.

5. The computer-implemented method of claim 3, wherein a machine learning model that predicts video context based on content in a video is used to identify the change to the template video.

6. The computer-implemented method of claim 2, further comprising storing the plurality of product features in a product feature database, wherein the product feature database associates each product feature in the plurality of product features with the data of a respective product feature and the product version for the respective product feature.

7. A computer system for automated generation of adaptive instructional product videos to indicate how a product is used based on requested feature sets in stored data, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
acquiring a plurality of product features from a server, wherein each product feature in the plurality of product features is associated with data selected from a group consisting of: text data, audio data, and image data;
receiving a request for an instructional product video, wherein a product in the instructional product video comprises a set of current product features in the plurality of product features, the request for the product video including a request to view instructions to utilize a specific version of a manufacturer's product or to view a specific product feature;
identifying the data associated with each current product feature in the set of product features for the request for the instructional product video;
generating the instructional product video using a generative adversarial neural network (GAN) based on identified data for the product, the instructional product video including frames showing the requested version of the manufacturer's product or the specific product feature;
acquiring a plurality of updated or revised product features from the server, the updated or revised product features associated with an update to the specific version of the manufacturer's product or the specific product feature; and
generating an updated instructional product video, the updated instructional product video including frames showing the updated or revised product feature associated with the update to the specific version of the manufacturer's product or the specific product feature and instructions how to use the updated specific version of the manufacturer's product or the updated specific product feature.

8. The computer system of claim 7, further comprising:
identifying a product version for each product feature in the plurality of product features; and
generating a template video for the product version from the data associated with each product feature having the identified product version.

9. The computer system of claim 8, further comprising:
determining that a product feature in the set of product features for the request does not include the product version for the template video;
identifying a change to the template video based on the product feature; and
modifying the template video based on an identified change to the template video.

10. The computer system of claim 9, wherein the modifying the template video includes removing a video frame associated with the product feature from the template video, wherein the product feature is determined to be an obsolete product feature.

11. The computer system of claim 9, wherein a machine learning model that predicts video context based on content in a video is used to identify the change to the template video.

12. The computer system of claim 8, further comprising storing the plurality of product features in a product feature database, wherein the product feature database associates each product feature in the plurality of product features with the data of a respective product feature and the product version for the respective product feature.

13. A computer program product for automated generation of adaptive instructional product videos to indicate how a product is used based on requested feature sets in stored data, the computer program product comprising:
a computer-readable storage device having program instructions embodied therewith, the program instructions executable by a processor to cause the processor to perform a method comprising:
acquiring a plurality of product features from a server, wherein each product feature in the plurality of product features is associated with data selected from a group consisting of: text data, audio data, and image data;
receiving a request for an instructional product video, wherein a product in the instructional product video comprises a set of product features in the plurality of product features, the request for the product video including a request to view instructions to utilize a specific version of a manufacturer's product or to view a specific product feature;
identifying the data associated with each product feature in the set of product features for the request for the instructional product video;
generating the instructional product video using a generative adversarial neural network (GAN) based on identified data for the product, the instructional product video including frames showing the requested version of the manufacturer's product or the specific product feature;
acquiring a plurality of updated or revised product features from the server, the updated or revised product features associated with an update to the specific version of the manufacturer's product or the specific product feature; and
generating an updated instructional product video, the updated instructional product video including frames showing the updated or revised product feature associated with the update to the specific version of the manufacturer's product or the specific product feature and instructions how to use the updated specific version of the manufacturer's product or the updated specific product feature.

14. The computer program product of claim 13, further comprising:
   identifying a product version for each product feature in the plurality of product features; and
   generating a template video for the product version from the data associated with each product feature having the identified product version.

15. The computer program product of claim 14, further comprising:
   determining that a product feature in the set of product features for the request does not include the product version for the template video;
   identifying a change to the template video based on the product feature; and
   modifying the template video based on an identified change to the template video.

16. The computer program product of claim 15, wherein the modifying the template video includes removing a video frame associated with the product feature from the template video, wherein the product feature is determined to be an obsolete product feature.

17. The computer program product of claim 15, wherein a machine learning model that predicts video context based on content in a video is used to identify the change to the template video.

* * * * *